UNITED STATES PATENT OFFICE.

SAMUEL ERNEST GROVES, OF FELLING-ON-TYNE, ENGLAND.

DOPE OR VARNISH FOR AIRCRAFT CONSTRUCTIONS.

1,366,256.     Specification of Letters Patent.    Patented Jan. 18, 1921.

No Drawing.     Application filed August 2, 1918. Serial No. 248,056.

*To all whom it may concern:*

Be it known that I, SAMUEL ERNEST GROVES, a subject of the King of Great Britain, residing in Felling-on-Tyne, England, have invented certain new and useful Improvements in Dopes or Varnishes for Aircraft Constructions, of which the following is a specification.

Dopes, varnishes or finishing materials for aircraft construction consist mainly of cellulose esters or ethers dissolved in volatile solvents. The rapidity with which the solvents evaporate creates difficulty in the application of the dope or varnish to the surface to be coated. Moreover, the coating does not sufficiently resist penetration of water.

Waxes have been added to cellulose ester varnishes with the result that the rate of evaporation of the volatile solvents has been retarded whereby it has been easier to apply the varnish.

By my invention a considerably better effect in retarding evaporation is attained by using a mixture of waxes for the purpose in question, probably because as the waxes separate from the solvent in admixture with each other they remain longer in the plastic state than either of them separately would. The proportion of wax may be varied within wide limits; as an example, it may be stated that for a celluloid dope in which the solvent is a mixture of acetone or other ketone, alcohol and benzole, the proportion of wax may equal that of the celluloid; for instance, if the latter is between 5 and 8 per cent. there may be added beeswax to constitute between 4 and 5 per cent. and paraffin wax to constitute between 2 and 3 per cent. of the mixture.

Having thus described the nature of the said invention and the best means I know of carrying the same into practical effect, I claim:—

1. A cellulose ester varnish containing a mixture of waxes adapted to retard evaporation of the volatile solvent of the varnish while the latter is being applied.

2. A cellulose ester varnish containing a mixture of beeswax and paraffin wax adapted to retard evaporation of the volatile solvent of the varnish while the latter is being applied.

3. A cellulose ester varnish containing a mixture of beeswax and paraffin wax the quantity of which mixture is equal to the quantity of cellulose ester.

In testimony whereof I have signed my name to this specification in the presence of a subscribing witness.

SAMUEL ERNEST GROVES.

Witness:
    C. S. HOPKINS.